(12) United States Patent
Liu et al.

(10) Patent No.: US 10,157,067 B2
(45) Date of Patent: Dec. 18, 2018

(54) SYSTEM OPTIMIZING METHOD AND APPARATUS

(71) Applicant: BEIJING QIHOO TECHNOLOGY COMPANY LIMITED, Beijing (CN)

(72) Inventors: Jin Liu, Beijing (CN); Jixin Yang, Beijing (CN); Liang Li, Beijing (CN); Haiyang Wang, Beijing (CN); Zhen Ding, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 477 days.

(21) Appl. No.: 14/781,517

(22) PCT Filed: Mar. 20, 2014

(86) PCT No.: PCT/CN2014/073802
§ 371 (c)(1),
(2) Date: Sep. 30, 2015

(87) PCT Pub. No.: WO2014/161431
PCT Pub. Date: Oct. 9, 2014

(65) Prior Publication Data
US 2016/0055013 A1  Feb. 25, 2016

(30) Foreign Application Priority Data
Apr. 2, 2013 (CN) .......................... 2013 1 0113131

(51) Int. Cl.
*G06F 9/455* (2018.01)
*G06F 9/445* (2018.01)
(Continued)

(52) U.S. Cl.
CPC ...... *G06F 9/44505* (2013.01); *G06F 9/44594* (2013.01); *G06F 11/3024* (2013.01); *G06F 11/3409* (2013.01)

(58) Field of Classification Search
None
See application file for complete search history.

(56) References Cited

U.S. PATENT DOCUMENTS

2003/0154216 A1* 8/2003 Arnold .............. G06F 17/30292
2004/0267548 A1* 12/2004 Jones .................. G06F 11/3409
705/34
(Continued)

FOREIGN PATENT DOCUMENTS

CN   101093456 A   12/2007
CN   101243381 A   8/2008
(Continued)

OTHER PUBLICATIONS

"360 Security Guard 9.0 Obviously Speeds Up a Computer via a Click", acquired on the internet http://roll.sohu.com/20130225/n366930071.shtml, Feb. 25, 2013, Paragraphs 1-5, Figures 1-4.
International Search Report for corresponding International Application No. PCT/CN2014/073802, dated Jun. 20, 2014.

*Primary Examiner* — Tammy E Lee
(74) *Attorney, Agent, or Firm* — Alston & Bird LLP

(57) ABSTRACT

The present invention relates to the technical field of network communications, and discloses a system optimizing method and apparatus. The system optimizing method comprises: judging whether programs running in the system meet a preset optimization rule; displaying programs that meet the preset optimization rule in a first class of a program list and displaying programs that do not meet the preset optimization rule in a second class of the program list, wherein states of the programs in the first class are selected by default and states of the programs in the second class are not selected by default; and performing optimization processing for programs in the program list whose states are selected according to a triggered optimization instruction, wherein the optimization instruction includes the states of the programs in the program list. In this way, the problem in (Continued)

the prior art that an undesirable optimization effect is achieved because file cleaning work can only be simply executed is solved, and an advantageous effect of effectively processing various conditions of the system is obtained so as to reasonably optimize the system.

20 Claims, 6 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 2008/0270933 | A1* | 10/2008 | Straw | G06F 3/0481 715/781 |
| 2010/0058087 | A1* | 3/2010 | Borras | G06F 1/3203 713/322 |
| 2012/0297215 | A1* | 11/2012 | Saba | G06F 1/3203 713/320 |
| 2013/0151814 | A1 | 6/2013 | Ueda | |

FOREIGN PATENT DOCUMENTS

| | | |
|---|---|---|
| CN | 101937446 A | 1/2011 |
| CN | 101996101 A | 3/2011 |

* cited by examiner 360 accelerating ball 

Computer is energetic

Available memory is sufficient, please continue to maintain

One-click speedup

Optimize system resources

📋 Clean system memory and garbage

Programs/services recommended to be closed

| | | |
|---|---|---|
| 🟦 360 cloud disk | 78.7MB | ☐ |
| Inte quick storage service | 4.5MB | ☑ |
| Chinese network TV background service | 3MB | ☑ |
| Graphics card interface auxiliary program | 1.8MB | ☑ |
| 360 mobile phone helper service | 1.7MB | ☑ |
| 360 computer expert service | 1.7MB | ☑ |

🔧 Computer acceleration    📶 Checking network speed

Fig. 1a

System stability and speed optimization

Optimize allocation of resources of processor
Obtain more resources such as CPU and memory resource when playing games to shorten the latency, which is very suitable for anti-terrorism type games.

Optimize memory configuration
Increase the disk buffer of a game program, improve read/write speed, and quicken an uploading speed of duplicates and scenarios.

Optimize response time of program
Prevent fake death of the program when being closed so that the power-off speed of the computer is made quicker.

Shorten no-response wait time of mouse and keyboard
Since the mouse and keyboard cannot move when the program gets crash, the crash duration of the program can be shortened after optimization.

Automatically closing no-response program
Automatically close the program upon the detection of a crash of the program to improve the system stability.

Remove useless dll files from memory
Remove residual garbage dll files from the system to improve the system performance.

Desktop, windows and menu speed optimization

Quicken display and response speed of each command in system
Reduce the latency setting when clicking the menu of the software may allow the menu of the software to be opened quicker.

Optimize user interface component
Automatic refreshing is performed when an interface dies falsely or crashes to enhance the system stability.

Optimize program process
False death can be prevented by allowing the start menu to possess an independent process priority level for processing.

Fig. 2a

| Accelerate system speed | |
|---|---|
| [i] Clean system memory | Already cleaned |
| [i] System speed optimization | Already optimized |

Fig. 2b

Fig. 3

SYSTEM OPTIMIZING METHOD AND APPARATUS

FIELD OF THE INVENTION

The present invention relates to the technical field of network communications, and in particular, to a system optimizing method and apparatus.

BACKGROUND OF THE INVENTION

Currently, a situation of running slower and slower usually occurs to a computer during the process of being used. At this time, in order to improve the running speed, system optimization needs to be performed. A current optimizing manner is generally to clean files or garbage, clean useless cache files from the system, look up and move files occupying disk space so as to release space, keep the system clean and make overall running smoother.

Some current services and application programs usually do not exit the processes after completion, these processes still occupy a lot of system resources, a user usually cannot sense this until the situation of crash or failure occurs to the system or program, and some defective programs might even occur. However, the current system optimizing manner can only perform some basic file cleaning work and cannot effectively processing the situations such as a crash of the system or excessive traffic occupied by the background programs, and cannot effectively release useable memory and other system resources in the system.

SUMMARY OF THE INVENTION

In view of the above problems, the present invention is proposed to provide a system optimizing method and a corresponding apparatus, which can overcome the above problem or at least partially solve the above problem.

According to an aspect of the present invention, there is provided a system optimizing method, comprising: judging whether a program running in the system satisfies a preset optimizing rule; displaying programs satisfying the preset optimizing rule in a first class of the program list, and display programs not satisfying the preset optimizing rule in the second class of the program list, wherein states of the programs in the first class are selected by default, and states of the programs in the second class are not selected by default; performing optimization processing for programs in the program list whose states are selected according to a triggered optimization instruction, wherein the optimization instruction includes the states of the programs in the program list.

According to another aspect of the present invention, there is provided a system optimizing apparatus, comprising: a judging module configured to judge whether a program running in the system satisfies a preset optimizing rule; a display module configured to display programs satisfying the preset optimizing rule in the first class of the program list, and display programs not satisfying the preset optimizing rule in the second class of the program list, wherein states of the programs in the first class are selected by default, and states of the programs in the second class are not selected by default; an optimizing module configured to perform optimization processing for programs in the program list whose states are selected according to a triggered optimization instruction, wherein the optimization instruction includes the states of the programs in the program list.

According to a further aspect of the present invention, there is provided a computer program which comprises a computer readable code; when the computer readable code is run on a computing device, the system optimizing method is executed on the computing device.

According to a further aspect of the present invention, there is provided a computer readable medium which stores the aforesaid computer program.

Advantageous effects of the present invention are as follows:

According to the system optimizing method and apparatus of the present invention, programs running in the system are displayed in different classes according to preset optimizing rules, and the user can decide which programs should be optimized according to characteristics of different classes, thereby solving the problem that the prior art can only simply execute file cleaning work and causes a dissatisfactory optimizing effect, and thereby achieving the effect of performing effective processing for various situations of the system (e.g., the crashing of the system, and excessive traffic occupied by background programs) so as to reasonably optimize the system.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures:

FIGS. 1a-1c illustrate a schematic diagram of an interface of an optimization software using the optimizing method according to the present invention;

FIG. 2a illustrates a schematic diagram of an interface when a system speed is optimized;

FIG. 2b illustrates a schematic diagram of an interface after the system speed is optimized;

FIG. 3 illustrates a schematic diagram of a floating window;

DETAILED DESCRIPTION OF THE INVENTION

The present invention will be further described in conjunction with figures and specific embodiments.

Figure 1B:
Figure 1C:

An embodiment of the present invention provides a system optimizing method, this method is mainly used for executing optimization processing with respect to the currently-running programs in the system to improve the running speed of the computer. The optimizing method can be implemented by an optimization software installed on a client. FIG. 1a-FIG. 1c illustrate a schematic diagram of an interface of an optimization software using the optimizing method according to the present invention. As shown in FIG. 1a-FIG. 1c, the interface mainly displays a program list including a plurality of programs to a user. In the program list, programs are classified according to characteristics of each program itself into the following classes: "optimize system resources", "programs/services recommended to be closed", "programs/services to be selectively closed", and "commonly-used programs".

When the system needs to be optimized, a corresponding optimization processing can be executed according to characteristics of respective classes shown in FIG. 1a-FIG. 1c. For example, take the class "optimize system resources" as an example, when performing an system optimization, two tasks of cleaning the memory of the system and optimizing the system speed are mainly completed through this class. Wherein cleaning the system memory is mainly implemented by importing the currently-running programs from a physical memory into a virtual memory. The specific importing procedure can be implemented by invoking an interface function provided by a Windows system. With the currently-running program being imported from the physical memory into the virtual memory, the physical storage space can be released and the memory occupation rate can be reduced. Optimizing the system speed is mainly implemented by reasonably setting relevant parameters of the system. For example, as shown in FIG. 2a, optimization can be executed in the following aspects when optimizing the system speed. First, the following optimization processing can be executed with respect to the system stability and system speed: (1) optimizing the allocation of the resources of the processor: through a reasonable allocation of the resources of the processor, the user can obtain more resources such as CPU and memory when playing games, and the latency is made much shorter, which is very suitable for anti-terrorism type games; (2) optimizing the memory configuration: through a reasonable memory configuration, the disk buffer of a game program can be increased, the read/write speed can be improved, and the uploading speed of duplicates and scenarios can be quickened; (3) optimizing the response time of the program: through a reasonable setting of the response time of the program, the fake death of the program when being closed can be prevented so that the power-off speed of the computer is made quicker; (4) shortening no-response wait time of a mouse and a keyboard: since the mouse and keyboard cannot move when the program gets crash, the crash duration of the program can be shorten by shortening the no-response wait time of the mouse and keyboard; (5) automatically closing a no-response program: automatically close the program upon the detection of a crash of the program to improve the system stability; (6) closing services: some services (e.g., windows update service) occupying excessive system resources such as memory are closed, such types of services are characterized by occupying too much memory upon running and exerting an adverse impact on the user's computer after being closed; (7) removing useless dll files from the memory: the system performance can be improved by removing residual garbage dll files or other temporary files from the system. Secondly, the following optimization processing can be performed with respect to desktop, windows and menu speed: (1) quickening a display and response speed of each command in the system: reducing the latency setting when clicking the menu of the software can make the menu of the software to be opened quicker; (2) optimizing a user interface component: automatic refreshing is performed when an interface dies falsely or crashes to enhance the system stability; (3) optimizing the program process: false death can be prevented by allowing the start menu to possess an independent process priority level for processing. The display interface after the system speed is optimized is as shown in FIG. 2b. Through the above processing, the purpose of optimizing the system resources can be realized so as to reduce the resource occupation rate, shorten the invalidity wait time and improve the user's experience.

In addition, to enable the user to know the current resource occupation rate of the system in real time to decide whether to execute the optimization processing, the client can calculate the current resource occupation rate of the system in real time, and display the calculated current resource occupation rate in the form of a floating ball at a designated location of the program list shown in FIG. 1a-FIG. 1c (e.g., display it at a left upper corner). The display color of the floating ball can further vary with the resource occupation rate, for example, when the resource occupation rate is lower than a first preset value, the color of the floating ball is green with a text prompt "available resources are sufficient, please continue to maintain" being presented beside for the user. To facilitate the user's understanding, a text "the computer is energetic" can be further displayed to the user. When the resource occupation rate is higher than a second preset value, the color of the floating ball is red with a text prompt "available resources are insufficient, an optimization is suggested" being presented beside for the user. To facilitate the user's understanding, a text "the computer is tired" can be further displayed to the user. When the resource occupation rate is between the first preset value and the second preset value, the color of the floating ball is orange with a text prompt "less resources remain available" being presented beside for the user. To facilitate the user's understanding, a text "the computer cannot run further" can be further displayed to the user. Furthermore, a percentage of the current resource occupation rate can be displayed in the floating ball to help the user to accurately learn about the use of resources. Wherein, the second preset value can be set according to the configuration of the computer, for example, since a highly configured compute has sufficient resources, an occupation of 80% of the resources will not cause too much influence, whereas since a less-configured computer has less resources, an occupation 80% of the resources will cause a larger influence. Hence, the second preset value of the highly configured computer can be higher than that of the less configured computer. Likewise, the first preset value can be flexibly set according to the configuration of the computer.

The above resources may comprise one or more of the following resources: memory resource, disk resource, CPU resource and network throughput. In FIG. 1a to FIG. 1c, the resource indicated by the floating ball is memory resource, the color of the floating ball is green which indicates that the computer is energetic, so the prompting texts "available resources are sufficient, please continue to maintain" and "the computer is energetic" are displayed beside the floating ball. In practice, the floating ball may indicate an occupation rate of a certain other resource. When the floating ball indicates the occupation rate of a certain other resource, the prompting wording displayed beside the floating ball is also correspondingly amended to the name of the resource, for example, when the floating ball indicates the occupation rate of the CUP resource, the text displayed beside the foaling ball can be "available CPU is sufficient, please continue to maintain" or "CPU is excessively occupied, an optimization is suggested", or the like. In addition, the floating ball can simultaneously indicate the occupation rate of a plurality of resources so that the user can thoroughly learn about the current use of resources. When the floating ball indicates the occupation rate of a plurality of resources, different weights can be allocated to each resource according to its role in the performance optimization, and weighting is performed according to the weights occupied by each resource to obtain a weight value that can comprehensively reflect a comprehensive occupation rate of the plurality of resources. The weight value can be either expressed in the form of a score (e.g., a score between 0 and 100) or a percentage. At this time, one floating ball can be used to display a specific value of the weight value to help the user to learn about the comprehensive occupation of various resources; or a plurality of floating balls can be used to respectively indicate the occupation of each type of resource so that the user can visually learn about the current occupation of each type of resource.

In addition, when the user moves the mouse to the floating ball, further prompt will occur beside the floating ball to display an amount of the already-used memory and a total sum. Furthermore, the color of the floating ball and the color of the prompting text can vary with the already-used memory. Besides, a floating window as shown in FIG. 3 can be set at a designated position (e.g., right upper corner or right lower corner) of the display interface. The display state of a ball in the floating window is as same as the floating ball displayed on the program list. When the program list is minimized, the floating window can realize the effect of prompting the user.

In addition to the aforesaid mode of implementing a real-time calculation of the resource occupation rate, a button may be provided individually. When the user clicks the button, the resource occupation rate is calculated and displayed to save the calculation workload and save energy consumption.

When the floating ball is provided, when the floating ball displays that the resource occupation rate is too high (e.g., when the floating ball is red), the user can click a corresponding optimization key to execute the above-mentioned processing of "optimize system resources", or the system can automatically trigger the above-mentioned processing of "optimize system resources". Additionally, when the above-mentioned processing of "optimize system resources" is triggered by the system automatically, the system can perform the optimization regularly.

In addition, after the above-mentioned processing of "optimize system resources" is completed, a prompting content can be further displayed to the user, and the prompting content can be a popped-up message or window or a prompting text displayed at a designated position of the program list. The prompting content is mainly used to display to the user the specific quantity of various resources such as memory, CPU, disk space and/or network throughput saved by the optimization to help the user to learn about the optimization effect.

In the aforesaid class "optimize system resources", some conventional and thorough system cleaning works are mainly executed. With the class "optimize system resources" having been introduced, the introduction will focus on the processing manners in the classes "programs/services recommended to be closed", "programs/services to be selectively closed" and "commonly-used programs" involved in the system optimizing method of the present invention. Wherein the class "programs/services recommended to be closed" may also be called a first class, and the class "programs/services to be selectively closed" and the class "commonly-used programs" may be collectively called a second class, wherein the class "programs/services to be selectively closed" may serve as a second subclass in the second class, and the class "commonly-used programs" may serve as a first subclass in the second class.

Figure 4:
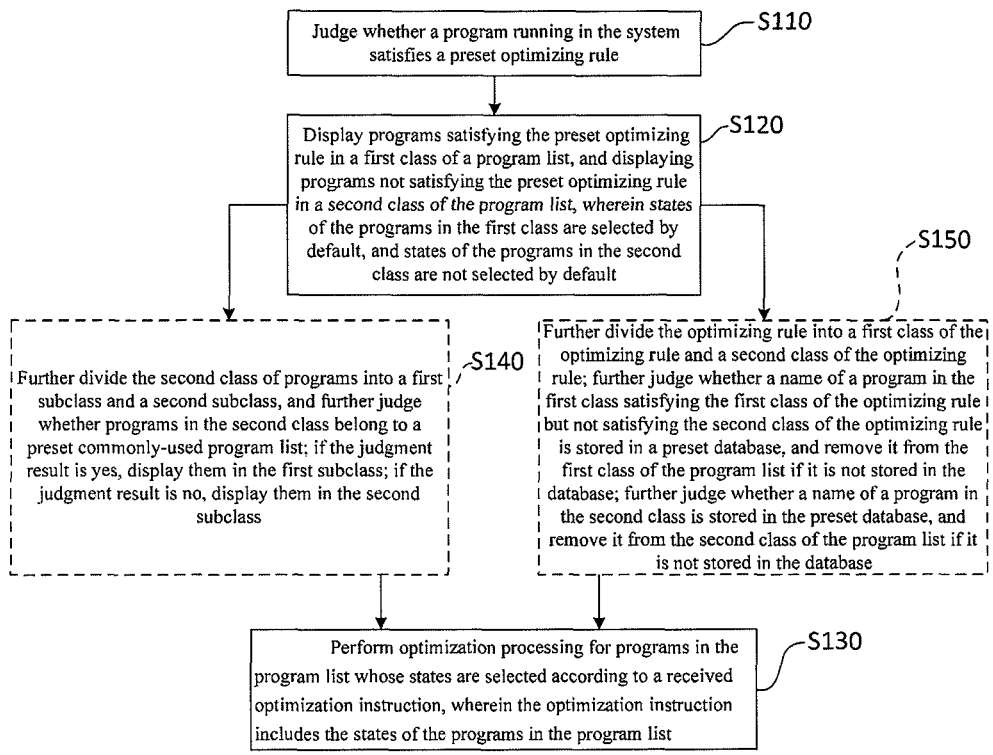
FIG. 4 illustrates a flow chart of the system optimizing method according to an embodiment of the present invention.

When the user opens the optimizing software installed on the client corresponding to the system optimizing method of the present invention, or when the user clicks a start button on the optimizing software, step S110 in the system optimizing method provided by the present invention starts to be executed. In step S110, a judgment is conducted as to determine whether a program running in the system satisfies a preset optimizing rule, as shown in FIG. 4.

Specifically, in step S110, a judgment can be conducted for each running program in the system to determine whether the program satisfies the preset optimizing rule.

Then, in step S120, the programs satisfying the above preset optimizing rule are displayed in the first class (the class "programs/services recommended to be closed" as shown in FIG. 1a to FIG. 1c) of the program list, and the programs not satisfying the above preset optimizing rule are displayed in the second class (the class "programs/services to be selectively closed" and the class "commonly-used programs" as shown in FIG. 1a to FIG. 1c) of the program list, wherein the states of the programs in the first class are selected by default, and the states of the programs in the second class are not selected by default.

Finally, in step S130, an optimization processing is performed for the programs in the program list whose states are selected according to a triggered optimization instruction. Wherein, the optimization instruction is usually triggered by the user, for example, triggered by clicking a "one-click speedup" button in FIG. 1a to FIG. 1c. Before the user triggers the optimization instruction, the state of each program in the program list shown in FIG. 1a to FIG. 1c needs to be set first, and the states of the programs include "selected" and "not selected". If the user agrees to select all programs in the first class and not to select all programs in the second class, i.e., recognizes the default states of the programs, no extra setting needs to be performed, and the "one-click speedup" button can be directly clicked to trigger the optimization instruction; if the user believes that a certain program in the first class should not be optimized, the user can select the state of the program as "not selected", and correspondingly, if the user believes that a certain program in the second class should be optimized, the user can select the state of the program as "selected". In this way, the optimization instruction includes the state of each program in the program list, then the programs in the program list whose states are selected can be acquired when receiving the optimization instruction, and an optimization processing can be performed for them. When the optimization processing is performed, the resource occupation amount displayed in the floating ball first falls, then rises, and finally stops at an optimized resource occupation amount.

Specifically, in step S130, when the optimization processing is performed, it can be done in one or more of the following manners: (1) closing the programs to be optimized: directly closing the programs in the program list whose states are selected so as to reduce the resource occupation rate and improve the running speed; (2) setting CUP priority levels for the programs to be optimized: setting CUP priority levels for the programs to be optimized according to their importance degrees, setting a high CUP priority level for an important program, and setting a low CPU priority level for an unimportant program so as to shorten the response time of the important programs and reduce the user's wait time, this manner can be mainly used for some programs that are not suitable to be closed directly; (3) switching the program to be optimized from the multiple cores of a multi-core CPU to one core: this manner can be mainly used for some crash programs, to prevent these programs from occupying excessive CPU resources, they can be switched from the multiple cores of a multi-core CPU to one core to avoid the influence on other cores.

In addition, after the above step S130 is completed, a prompting content can be further displayed to the user. The prompting content may also be a popped-up message or window, or a prompting text displayed at a designated position of the program list. The prompting content is used to display to the user the specific quantity of various resources such as memory, CPU, disk space and/or network throughput saved by the optimization in step S130 to help the user to learn about the optimization effect.

The optimization processing of the system can be implemented in the above manners.

Besides, as can be seen from FIG. 1a to FIG. 1c, in an embodiment of the present invention, the programs in the second class are further classified into a first subclass (namely, the class "commonly-used programs") and a second subclass (namely, "programs/services to be selectively closed"), wherein the first subclass mainly displays some commonly-used programs such as the 360 safety browser, Microsoft word, and Fetion; the second subclass displays other programs in the second class except for the first subclass. To determine which program in the second class belongs to the first subclass and which program belongs to the second subclass, a commonly-used program list needs to be preset, in the commonly-used program list, names of various commonly-used programs are stored. Correspondingly, in step S120, after the programs not satisfying the above preset optimizing rule are displayed in the second class of the program list, the method further comprises a step S140. In step S140, a judgment is further performed to judge whether the programs in the second class belong to the preset commonly-used program list; if the judgment result is yes, they are displayed in the first subclass; if the judgment result is no, they are displayed in the second subclass.

As stated above, the states of the programs in the second class are not selected by default, so the sates of the programs in the first subclass (namely, the class "commonly-used programs") are not selected by default. However, the case slightly differs for the second subclass (namely, the class "programs/services to be selectively closed"): before the optimization instruction is received for the first time, the states of the programs in the second subclass are not selected by default, which is as same as the first subclass. However, if before the user sends the optimization instruction for the first time, the states of some programs (e.g., "alipay control", "alipay detection program" and the like as shown in FIG. 1a to FIG. 1c) in the second subclass are manually changed to "selected", i.e., in the optimization instruction received for the first time, the programs whose states are manually changed in the second subclass are in the "selected" state. As such, before the optimization instruction is received for the second time, the default states of the programs whose states are manually changed in the second subclass still remain "selected". In the similar way, except that the states of the programs in the second subclass before the optimization instruction is received for the first time are "not selected" by default, before subsequently receiving the optimization instruction, the states of the programs in the second subclass are considered by default as same as the states in the optimization instruction received last time. That is to say, the states of the programs in the second subclass have a memory function, if the user optimizes some programs therein when executing the optimization instruction this time, the default states of these optimized programs will be changed to "selected" before executing the optimization instruction next time. An advantage of so doing lies in that, generally, if the user executes an optimization for some programs this time, this indicates that these programs are considered by the user as being necessary to optimize. Therefore, when performing the optimization next time, the user may still incline to optimize these programs. Hence, the memory function of the programs in the second subclass can help the user to memorize his own selections last time so as to improve the optimizing efficiency. In addition, a main reason for arranging the commonly-used programs as a subclass and not enabling the programs in this subclass to have the memory function so that each time the default state thereof is "not selected" is that, generally, commonly-used programs do not need to be optimized, and if the user inadvertently optimizes the commonly-used programs, this usually affects the normal use of the programs. Hence, classifying the commonly-used programs in an individual subclass can prevent the user from misoperating.

In addition, to further prevent the user from misoperating, in the program list as shown in FIG. 1a to FIG. 1c, the first class can be displayed above or on the left of the second class, and the second subclass in the second class can be displayed above or on the left of the first subclass. In other words, the first class with a maximum optimization possibility is arranged on the top for easy selection of the user; the first subclass with a minimum optimization possibility is arranged at last to prevent the user's inadvertent selection.

Besides, it should be noted that the operation of further classifying the second class into the first subclass and the second subclass in step S140 as introduced above is not requisite, and step S140 may not be executed in the present invention.

System optimization can be implemented through the above operations. In the above procedure, generally, each running program in the system needs to be displayed in the first class or the second class of the program list. The advantage of doing so lies in that each running program in the system can be screened one by one to determine whether it needs to be optimized, thereby avoiding omission of any program that can be optimized.

Although the above procedure can realize a full optimization of all programs in the system, if there are too many running programs in the system, the above behavior will cause a massive number of programs in the program list so that the user cannot conveniently screen the programs to be optimized. For this reason, a database can be preset in the present invention to store names of the common to-be-optimized programs. The common to-be-optimized programs stored in the database usually refer to some programs with a higher optimization frequency and apparent optimization effects. Names of these programs are usually obtained in advance by making statistics of the names of programs optimized in the past and their optimization frequency.

Correspondingly, after step S120, the method may further comprise step S150. In step S150, the aforesaid preset optimizing rule is further finely classified into a first class of the optimizing rule and a second class of the optimizing rule. Furthermore, a judgment is further conducted to the programs in the first class satisfying the first class of the optimizing rule but not satisfying the second class of the optimizing rule to judge whether the names thereof are stored in the above database, and they will be removed from the first class of the program list if they are not stored in the above database; a judgment is further conducted to the programs in the second class to judge whether the names thereof are stored in the above database, and they will be removed from the second class of the program list if they are not stored in the above database. The operation in step S150 can substantially reduce the number of programs in the program list to facilitate the user's selection.

A main basis for judging a program needs to be removed from the program list when executing step S150 lies in the following: there are diverse programs running in the system, many programs are installed and run by the user according to his own career characteristics or interests or hobbies, and the user's normal use will be affected once these programs are optimized. Hence, generally, programs that can be optimized are all common to-be-optimized programs, and are already pre-stored in the aforesaid database. Therefore, if the programs in the first class or the second class in the program list do not belong to the above database, this indicates that the programs probably do not need be optimized and therefore can be removed from the program list to reduce the user's screening workload.

However, there is an exception for the programs in the first class: when an abnormity happens to a program, no matter whether the program belongs to the above database or not, it should be optimized to prevent the abnormity from affecting the user's use. To this end, in the above step S150, the preset optimizing rule is further finely classified into the first class of the optimizing rule and the second class of the optimizing rule in advance, wherein the first class of the optimizing rule may also be called the optimizing rule in a general case, and it defines general rules to judge which programs need to be optimized (since the first class of the optimizing rule comprises many rules, they will be introduced in detail later); the second class of the optimizing rule may also be called the optimizing rule in an abnormal case, it defines abnormal rules to judge which programs need to be optimized, they comprise: judging whether an abnormity occurs to a program, and determining the program as satisfying the second class of the optimizing rule if the judgment result is yes, wherein the abnormity comprises: GDI leakage, window crash and CPU crash. Therefore, in step S150, when a program in the first class satisfies the second class of the optimizing rule, this indicates that an abnormity occurs to the program. Hence, no matter whether the program belongs to the above database or not, it needs to be retained in the first class of the program list for easy optimization of the user. When a program in the first class does not satisfy the second class of the optimizing rule, this indicates that an abnormity does not occur to the program. If the program does not belong to the above database, this further indicates that the program does not belong to common to-be-optimized programs. Such program might be the above-mentioned programs installed and run by the user according to his own career characteristics or interests or hobbies. Once it is optimized, it might affect the user's use. Hence, the programs in the first class not satisfying the second class of the optimizing rule are removed from the program list in step S150; on the contrary, if the programs belong to the above database, this indicates that the programs belong to common to-be-optimized programs. Although they do not satisfy the second class of the optimizing rule, they satisfy the first class of the optimizing rule since they occur in the first class, and it is necessary to optimize them. Hence, in step S150 they are retained in the first class of the program list to facilitate the user's optimization.

Likewise, since the programs in the second class all are programs not satisfying the preset optimizing rule, they probably do not need to be optimized. If such class of programs are not stored in the above database, this further indicates that they do not belong to common to-be-optimized programs and therefore do not need to be optimized. Therefore, such programs are also removed from the program list in step S150 to reduce the user's screening workload; on the contrary, if such programs are stored in the above database, this indicates that they belong to common to-be-optimized programs. Although they temporarily do not satisfy the preset optimizing rule, such programs still might be optimized. Hence, such programs are retained in the second class of the program list in step S150 so that the user can make a selection of whether to optimize or not.

The step S150 stated above is mainly realized by removing programs not belonging to the above database in the first list and second list. In practical situations, it is also feasible to, when executing the step S120, directly further judge whether the running programs in the system belong to the above database, and not displaying the programs not belonging to the above database in the program list unless they satisfy the second class of the optimizing rule.

The first class of the optimizing rule, namely, the general rule, mentioned in the preceding text is introduced below in detail. The first class of the optimizing rule comprises one or more of the following rules:

(1) Judging whether the resource occupation rate of a program exceeds a preset threshold value, and determining the program satisfies the first class of the optimizing rule if the resource occupation rate exceeds the threshold value, wherein the resource comprises one or more of the following resources: memory resource, disk resource and CPU resource.

Whether the above rule is satisfied can be judged by calculating the resource occupation rate of the program. A main aim of the rule is to find programs occupying excessive resources and optimize them to reduce the resource occupation rate. When determining programs occupying excessive resources, the determination can be dynamically performed according to the total size of the system resources and the total occupation rate of the system resources in the current state. Take the memory resource as an example, as to a client with a larger system memory (e.g., the system memory≥3G), if the system memory is totally occupied more than 70% in the current state, it can be determined that the programs occupying 64M of the memory are programs satisfying the first class of the optimizing rule; if the system memory is totally occupied more than 50% and less than 70% in the current state, it can be determined that programs occupying 128M of the memory are programs satisfying the first class of the optimizing rule. As to a client with a smaller system memory (e.g., the system memory<3G), if the system memory is totally occupied more than 70% in the current state, it can be determined that the programs occupying 32M of the memory are programs satisfying the first class of the optimizing rule; if the system memory is totally occupied more than 50% and less than 70% in the current state, it can be determined that programs occupying 64M of the memory are programs satisfying the first class of the optimizing rule. In one word, in the case that the smaller the total memory of the system is and the smaller the remaining memory of the system is, the amount of the memory occupied by the programs satisfying the first class of the optimizing rule is set lower; on the contrary, in the case that the larger the total memory of the system is and the larger the remaining memory of the system is, the amount of the memory occupied by the programs satisfying the first class of the optimizing rule is set higher.

(2) Judging whether a program occurs in the foreground running programs, and determining that the program satisfies the first class of the optimizing rule if it does not occur in the foreground running programs, wherein the foreground running programs comprise: programs running in the browser, programs displayed on a taskbar and programs displayed on a window.

Whether the above rule is satisfied can be judged by determining whether the currently running program in the system occurs in the foreground running programs. The rule is set because, usually, if the currently running program does not occur in the foreground running programs, this indicates that the program is currently not used by the user, and therefore this program is probably a program that does not need to be run.

Specifically, when a foreground running program is a program displayed on a window, this rule may further comprise: further judging whether the program displayed on the window is placed atop in the window if its use frequency is lower than a preset value, and determining that the program satisfies the first class of the optimizing rule if the judgment result is no. An aim of doing so is, for some programs with a lower use frequency, if they are not placed atop in the window, this indicates that the programs are not used currently. Hence, the programs are probably programs that the user forgets to close.

(3) Judging whether a program complies with a preset blacklist rule, and determining that the program satisfies the first class of the optimizing rule if it complies.

Some blacklist rules are preset in the rule. When the program complies with the preset blacklist rule, it is determined that the program satisfies the first class of the optimizing rule. Specifically, the blacklist rule is mainly used to define some rules that are satisfied by programs that the user does not desire to open. For example, some programs will automatically pop up advertisement windows, these automatically popped-up advertisement windows are usually those that the user does not desire to see and therefore cause unnecessary disturbance to the user. For this reason, rules satisfied by common advertisement windows can be set in the blacklist rule, e.g., characteristics such as a size of the window, title and attribute. When a popped-up window satisfies these characteristics, it can be determined that this window is an advertisement window so that it is listed in the first class of the program list for optimization. In addition to filtering programs such as advertisements, the blacklist rule may further close some unnecessary services (e.g., printer service that is not used in a long time period) or seed-making (seed-making whose lifetime is end caused by the power off of the uploading person's computer).

(4) Judging whether a program complies with a preset running condition, and determining that the program satisfies the first class of the optimizing rule if it does not comply.

Some programs must comply with certain running conditions to operate normally. If the running condition is not satisfied, the program cannot be used normally even if it is in a running state. Such programs that cannot be used normally because the running conditions are not satisfied can be optimized (e.g., closed). For example, some programs are interdependent, for example, program A must run depending on program B. Hence, when program A is detected running, detection can be further performed to judge whether program B is running. If the detection result is no, it can be determined that the running condition of program A does not comply, so program A will be optimized.

In addition to the rules as listed above, those skilled in the art may modify or complement the first type of the optimizing rule according to actual situations. Through the above-mentioned first class of the optimizing rule, programs to be optimized can be screened and placed in the first class of the program list for selection by the user.

The purpose of optimizing the system can be achieved through the above step S110-S150, wherein step S140 and step S150 are not requisite and they are optional steps.

In addition, in the above embodiment, all the running programs in the system are usually listed in the program list, even though partial programs can be removed from the program list through step S150 to avoid the increasing of the user's screening workload because programs that needn't be optimized are listed. However, step S150 mainly uses the database to screen programs in the program list. If the programs not satisfying the above optimizing rules belong to the programs in the database, they still need to be listed in the second class of the program list. However, some system programs or programs run by the optimizing software itself do not need to be listed to prevent misoperation. Hence, after step S120, the method may further comprise the following step: a judgment is further performed to the program in the second class to judge whether the program satisfies a preset protection condition, and the program is removed from the second class of the program list if it satisfies the preset protection condition. The protection condition may be a name of a preset system program or the name of the optimizing software itself. Besides the above setting and the manner of judging whether a program complies with the protection condition, programs satisfying the protection condition can be deleted from the database in advance to prevent them from being listed in the program list when they do not satisfy the second class of the optimizing rule.

Figure 5:
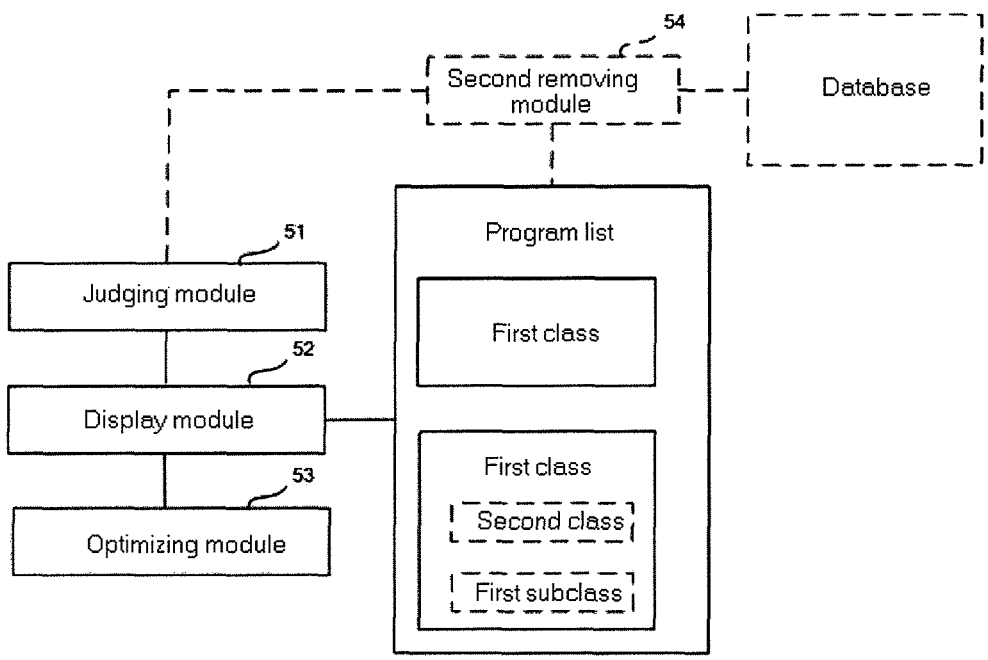
FIG. 5 illustrates a flow chart of the system optimizing apparatus according to an embodiment of the present invention.

An embodiment of the present invention further provide a system optimizing apparatus for executing the optimization processing mainly for currently-running programs in the system to improve the running speed of the computer. As shown in FIG. 5, the system optimizing apparatus comprises a judging module 51, a display module 52 and an optimizing module 53.

Wherein, the judging module 51 is configured to judge whether a program running in the system satisfies a preset optimizing rule. Reference may be made to the above depictions of step S110 for a specific operation procedure of the judging module, wherein reference may be made to a corresponding potion of the above method embodiment for specific content of the optimizing rule, which will not be detailed here.

The display module 52 is configured to display programs satisfying the above preset optimizing rule in the first class of the program list, and display programs not satisfying the above preset optimizing rule in the second class of the program list, wherein states of the programs in the first class are selected by default, and states of the programs in the second class are not selected by default. Reference may be made to the above depictions of step S120 for the specific operation procedure of the display module.

The optimizing module 53 is configured to perform optimization processing for programs in the program list whose states are selected according to a triggered optimization instruction, wherein the optimization instruction includes the states of programs in the program list. Reference may be made to the above depictions of step S130 for the specific operation procedure of the optimizing module.

Optionally, the above second class further comprises a first subclass and a second subclass. The judging module 51 is further configured to: judge whether a program in the second class belongs to a preset commonly-used program list; if the judgment result is yes, the display module 52 displays it in the first subclass; if the judgment result is no, the display module 52 displays it in the second subclass, wherein the state of the program in the second subclass is considered by default the same as the states in the optimization instruction received last time. Reference may be made to the above depictions of step S140 for division and judgment procedure of the first subclass and second subclass, which will not be detailed here.

In addition, to prevent the user's misoperation, the display module 52 is configured to display the first class above or on the left of the second class, and display the second subclass in the second class above or on the left of the first subclass. In other words, the first class with a maximum optimization possibility is arranged on the top for easy selection of the user; the first subclass with a minimum optimization possibility is arranged at last to prevent the user's inadvertent selection.

Optionally, to avoid unnecessary errors caused by optimization of the system programs or the programs run by the optimizing software itself, the apparatus may further comprise: a first removing module configured to further judge whether a program in the second class satisfies a preset protection condition, and remove it from the second class of the program list if it satisfies the preset protection condition. The protection condition can be the names of preset system programs or the name of the optimizing software itself.

Optionally, to avoid the problem that the number of programs in the program list is too huge because there are too many programs running in the system which does not facilitate the user in screening programs to be optimized. The above preset optimizing rule further comprises a first class of the optimizing rule and a second class of the optimizing rule. The apparatus further comprises: a second removing module 54 configured to further judge whether a name of a program in the first class satisfying the first class of the optimizing rule but not satisfying the second class of the optimizing rule is stored in the preset database, and remove it from the first class of the program list if it is not stored in the database; further judge whether a name of a program in the second class is stored in the preset database, and remove it from the second class of the program list if it is not stored in the above database.

Wherein the second class of the optimizing rule comprise: judging whether an abnormity occurs to a program, and determining that the program satisfies the second class of the optimizing rule if the judgment result is yes, wherein the abnormity comprises GDI leakage, window crash and CPU crash. The first class of the optimizing rule comprises one or more of the following rules: judging whether a resource occupation rate of a program exceeds a preset threshold value, and determining that the program satisfies the first class of the optimizing rule if the resource occupation rate exceeds the threshold value, wherein the resource comprises one or more of the following resources: memory resource, disk resource and CPU resource; judging whether a program occurs in foreground running programs, and determining that the program satisfies the first class of the optimizing rule if it does not occur in the foreground running programs, wherein the foreground running programs comprise: programs running in a browser, programs displayed on a taskbar and programs displayed on a window; judging whether a program complies with a preset blacklist rule, and determining that the program satisfies the first class of the optimizing rule if it complies; judging whether a program complies with preset running conditions, and determining that the program satisfies the first class of the optimizing rule if it does not comply. Furthermore, when a foreground running program is a program displayed on a window, the first class of the optimizing rule further comprises: further judging whether the program is placed atop in the window if a use frequency of the program displayed on the window is lower than a preset value, and determining that the program satisfies the first class of the optimizing rule if the judgment result is no.

Wherein the optimizing module 53 is specifically configured to close the program to be optimized; set a CPU priority level for the program to be optimized; and/or switch the program to be optimized from multiple cores of a multi-core CPU to one core.

In addition, to enable the user to learn about the current resource occupation to help the user to decide whether to perform optimization, the apparatus may further comprise: a calculating module configured to calculate the current resource occupation rate of the system in real time, and the module is further adapted to display the resultant current resource occupation rate in the form of a floating ball at a designated location of the program list. A display color of the floating ball varies with the resource occupation rate, a percentage of the resource occupation rate is displayed in the floating ball, wherein the resource comprises one or more of the following resources: memory resource, disk resource and CPU resource.

According to the system optimizing method and apparatus of the present invention, programs running in the system are displayed in different classes according to preset optimizing rules, and the user can decide which programs should to be optimized according to characteristics of different classes, thereby solving the problem that the prior art can only simply execute file cleaning work and causes a dissatisfactory optimizing effect, and thereby achieving the effect of performing effective processing for various situations of the system (e.g., the crashing of the system, and excessive traffic occupied by background programs). Embodiments of the present invention can not only close some unnecessary programs, services and background programs, but also can release more memory, close programs occupying too much network speed, and perform processing for programs in question, unnecessarily running programs and programs occupying much memory to reasonably optimize the system.

The description as provided here describes a lot of specific details. However, it is appreciated that embodiments of the present invention may be implemented in the absence of these specific details. Some embodiments do not specify detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the system optimizing apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 6:
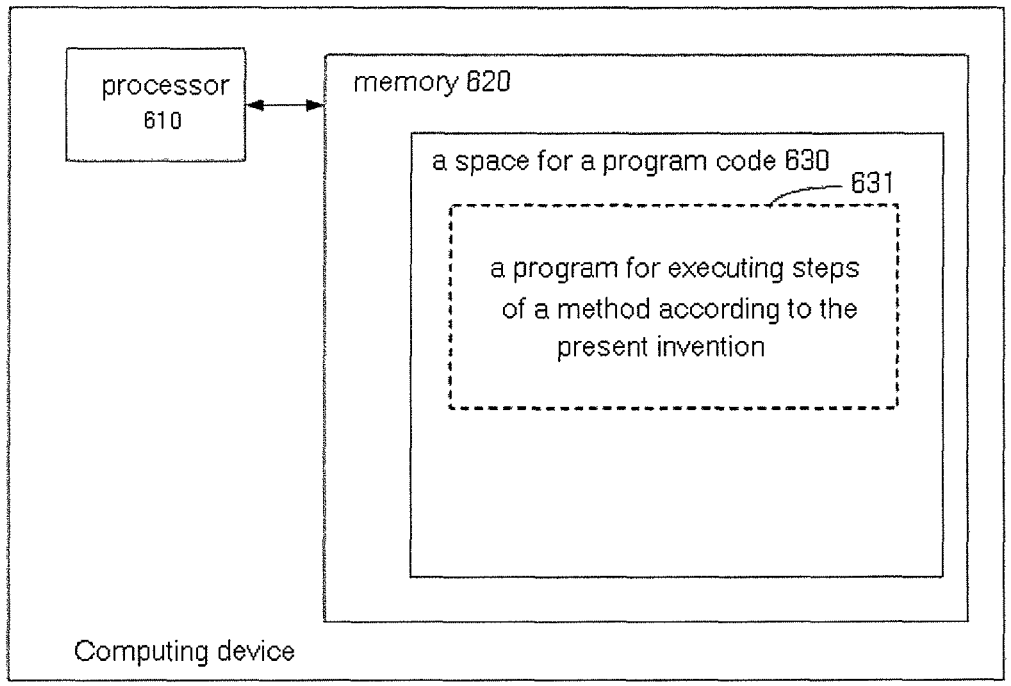
FIG. 6 schematically illustrates a block diagram of a computer device for executing the system optimizing method according to the present invention.
Figure 7:
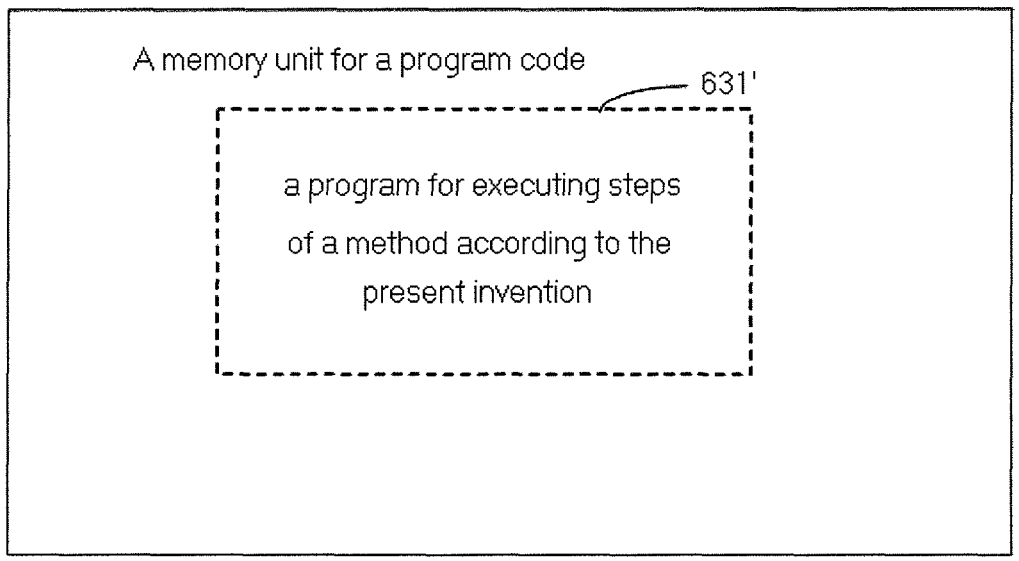
FIG. 7 schematically illustrates a memory unit for maintaining or carrying a program code for implementing the system optimizing method according to the present invention.

For example, FIG. 6 illustrates a computing device for implementing system optimization according to the present invention, for example a browser client. The computing device conventionally comprises a processor 610 and a computer program product or computer-readable medium in the form of a memory 620. The memory 620 may be a flash memory, EEPROM (Electrically Erasable Programmable Read-Only Memory), EPROM, hard disk or ROM-like electronic memory. The memory 620 has a storage space 630 for a program code 631 for executing any step of the above method. For example, the storage space 630 for the program code may comprise program codes 631 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 7. The memory unit may have a storage section, a storage space or the like arranged in a similar way to the memory 620 in the server of FIG. 6. The program code may for example be compressed in a suitable form. Usually, the memory unit includes a computer-readable code 631', namely, a code readable by a processor such as 610. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

The invention claimed is:

1. A system optimizing method, comprising:
   judging whether a program running in the system satisfies a preset optimizing rule;
   displaying programs satisfying the preset optimizing rule in a first class of a program list, and displaying programs not satisfying the preset optimizing rule in a second class of the program list, wherein states of the programs in the first class are selected by default, and states of the programs in the second class are not selected by default;
   performing optimization processing for programs in the program list whose states are selected according to a triggered optimization instruction, wherein the optimization instruction includes the states of the programs in the program list.

2. The method according to claim 1, wherein the second class further comprises a first subclass and a second subclass, and the method further comprises:

further judging whether a program in the second class belongs to a preset commonly-used program list;
if the judgment result is yes, displaying it in the first subclass; if the judgment result is no, displaying it in the second subclass, wherein the state of the program in the second subclass is considered by default the same as the state in the optimization instruction received last time.

3. The method according to claim 2, further comprising: displaying the first class above or on the left of the second class, and display the second subclass in the second class above or on the left of the first subclass.

4. The method according to claim 1, further comprising: further judging whether a program in the second class satisfies a preset protection condition, and removing it from the second class of the program list if it satisfies the preset protection condition.

5. The method according to claim 1, wherein the preset optimizing rule further comprises a first class of the optimizing rule and a second class of the optimizing rule, the method further comprises: further judging whether a name of a program in the first class satisfying the first class of the optimizing rule but not satisfying the second class of the optimizing rule is stored in a preset database, and removing it from the first class of the program list if it is not stored in the database;
further judging whether a name of a program in the second class is stored in the preset database, and removing it from the second class of the program list if it is not stored in the database.

6. The method according to claim 5, wherein the second class of the optimizing rule comprises: judging whether an abnormity occurs in a program, and determining that the program satisfies the second class of the optimizing rule if the judgment result is yes, wherein the abnormity comprises GDI leakage, window crash and CPU crash.

7. The method according to claim 5, wherein the first class of the optimizing rule comprises one or more of the following rules:
judging whether a resource occupation rate of a program exceeds a preset threshold value, and determining that the program satisfies the first class of the optimizing rule if the resource occupation rate exceeds the threshold value, wherein the resource comprises one or more of the following resources: memory resource, disk resource and CPU resource;
judging whether a program occurs in foreground running programs, and determining that the program satisfies the first class of the optimizing rule if it does not occur in the foreground running programs, wherein the foreground running programs comprise: programs running in a browser, programs displayed on a taskbar and programs displayed on a window;
judging whether a program complies with a preset blacklist rule, and determining that the program satisfies the first class of the optimizing rule if it complies;
judging whether a program complies with a preset running condition, and determining that the program satisfies the first class of the optimizing rule if it does not comply.

8. The method according to claim 7, wherein when a foreground running program is a program displayed on a window, the first class of the optimizing rule further comprises: further judging whether the program is placed atop in the window if a use frequency of the program displayed on the window is lower than a preset value, and determining that the program satisfies the first class of the optimizing rule if the judgment result is no.

9. The method according to claim 1, wherein the optimization processing specifically is: closing the program to be optimized; setting a CPU priority level for the program to be optimized; and/or, switching the program to be optimized from multiple cores of a multi-core CPU to one core.

10. The method according to claim 1, further comprising:
calculating a current resource occupation rate of the system, and displaying the current resource occupation rate in the form of a floating ball at a designated location of the program list, a display color of the floating ball varies with the resource occupation rate, and a percentage of the resource occupation rate is displayed in the floating ball, wherein the resource comprises one or more of the following resources: memory resource, disk resource and CPU resource.

11. A system optimizing apparatus, comprising:
a memory having instructions stored thereon;
a processor configured to execute the instructions to perform operations for optimizing a system, comprising:
judging whether a program running in the system satisfies a preset optimizing rule;
displaying programs satisfying the preset optimizing rule in a first class of a program list, and displaying programs not satisfying the preset optimizing rule in a second class of the program list, wherein states of the programs in the first class are selected by default, and states of the programs in the second class are not selected by default;
performing optimization processing for programs in the program list whose states are selected according to a triggered optimization instruction, wherein the optimization instruction includes the states of the programs in the program list.

12. The apparatus according to claim 11, wherein the second class further comprises a first subclass and a second subclass, and the operations for optimizing a system further comprising: judging whether a program in the second class belongs to a preset commonly-used program list;
if the judgment result is yes, displaying it in the first subclass; if the judgment result is no, displaying it in the second subclass, wherein the state of the program in the second subclass is considered by default the same as the state in the optimization instruction received last time.

13. The apparatus according to claim 12, wherein the operations for optimizing a system further comprising: displaying the first class above or on the left of the second class, and displaying the second subclass in the second class above or on the left of the first subclass.

14. The apparatus according to claim 11, wherein the operations for optimizing a system further comprising:
further judging whether a program in the second class satisfies a preset protection condition, and removing it from the second class of the program list if it satisfies the preset protection condition.

15. The apparatus according to claim 11, wherein the preset optimizing rule further comprises a first class of the optimizing rule and a second class of the optimizing rule, the operations for optimizing a system further comprising: further judging whether a name of a program in the first class satisfying the first class of the optimizing rule but not satisfying the second class of the optimizing rule is stored in a preset database, and removing it from the first class of the program list if it is not stored in the database; further judging whether a name of a program in the second class is stored in the preset database, and removing it from the second class of the program list if it is not stored in the database.

16. The apparatus according to claim 15, wherein the second class of the optimizing rule comprises: judging whether an abnormity occurs in a program, and determining that the program satisfies the second class of the optimizing rule if the judgment result is yes, wherein the abnormity comprises GDI leakage, window crash and CPU crash.

17. The apparatus according to claim 15, wherein the first class of the optimizing rule comprises one or more of the following rules:
  judging whether a resource occupation rate of a program exceeds a preset threshold value, and determining that the program satisfies the first class of the optimizing rule if the resource occupation rate exceeds the threshold value, wherein the resource comprises one or more of the following resources: memory resource, disk resource and CPU resource;
  judging whether a program occurs in foreground running programs, and determining that the program satisfies the first class of the optimizing rule if it does not occur in the foreground running programs, wherein the foreground running programs comprise: programs running in a browser, programs displayed on a taskbar and programs displayed on a window;
  judging whether a program complies with a preset blacklist rule, and determining that the program satisfies the first class of the optimizing rule if it complies;
  judging whether a program complies with preset running conditions, and determining that the program satisfies the first class of the optimizing rule if it does not comply.

18. The apparatus according to claim 11, wherein the optimizing processing specifically is: closing the program to be optimized; setting a CPU priority level for the program to be optimized; and/or, switching the program to be optimized from multiple cores of a multi-core CPU to one core.

19. The apparatus according to claim 11, the operations for optimizing a system further comprising:
  calculating a current resource occupation rate of the system in real time, and displaying the current resource occupation rate in the form of a floating ball at a designated location of the program list, a display color of the floating ball varies with the resource occupation rate, a percentage of the resource occupation rate is displayed in the floating ball, wherein the resource comprises one or more of the following resources: memory resource, disk resource and CPU resource.

20. A non-transitory computer readable medium having instructions stored thereon that, when executed by at least one processor, cause the at least one processor to perform operations for optimizing a system, comprising:
  judging whether a program running in the system satisfies a present optimizing rule;
  displaying programs satisfying the preset optimizing rule in a first class of a program list, and displaying programs not satisfying the present optimizing rule in a second class of the program list, wherein states of the programs in the first class are selected by default, and states of the programs in the second class are not selected by default;
  performing optimization processing for programs in the program list whose states are selected according to a triggered optimization instruction, wherein the optimization instruction includes the states of the programs in the program list.

* * * * *